United States Patent
Hable et al.

(10) Patent No.: US 12,054,649 B2
(45) Date of Patent: Aug. 6, 2024

(54) BILAYER REINFORCEMENT STRUCTURES

(71) Applicant: Zephyros, Inc., Romeo, MI (US)

(72) Inventors: Chris Hable, Romeo, MI (US); Michael Czaplicki, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 213 days.

(21) Appl. No.: 17/607,210

(22) PCT Filed: Apr. 20, 2020

(86) PCT No.: PCT/US2020/028987
§ 371 (c)(1),
(2) Date: Oct. 28, 2021

(87) PCT Pub. No.: WO2020/223053
PCT Pub. Date: Nov. 5, 2020

(65) Prior Publication Data
US 2022/0220349 A1 Jul. 14, 2022

Related U.S. Application Data

(60) Provisional application No. 62/839,948, filed on Apr. 29, 2019.

(51) Int. Cl.
*C09J 7/25* (2018.01)
*C09J 7/38* (2018.01)
*C09J 163/00* (2006.01)

(52) U.S. Cl.
CPC .............. *C09J 163/00* (2013.01); *C09J 7/25* (2018.01); *C09J 7/38* (2018.01); *C09J 2203/354* (2020.08);
(Continued)

(58) Field of Classification Search
CPC ........... B32B 5/20; B32B 27/18; B32B 27/38; B32B 2266/0271; B32B 2307/54;
(Continued)

(56) References Cited

U.S. PATENT DOCUMENTS

| | | | |
|---|---|---|---|
| 2016/0160087 A1* | 6/2016 | Miller | C08J 5/128 |
| | | | 525/65 |
| 2018/0057717 A1 | 3/2018 | Chopin | |
| 2018/0134926 A1* | 5/2018 | Lei | C09J 7/29 |

FOREIGN PATENT DOCUMENTS

| | | |
|---|---|---|
| CN | 104853910 A | 8/2015 |
| EP | 1391250 A2 | 2/2004 |

(Continued)

OTHER PUBLICATIONS

Machine Translation of WO-2018/186262 A1 (Year: 2018).*
Brian Kell, "Sets", published at math.cmu.edu/~bkell/21110-2010s/sets.html (Year: 2010).*
PCT International Search Report & Written Opinion Dated Jul. 7, 2020, Application No. PCT/US2020/028987.

(Continued)

*Primary Examiner* — Scott R. Walshon
(74) *Attorney, Agent, or Firm* — The Dobrusin Law Firm, PC (57) ABSTRACT

A multi-layer composition to be located onto a substrate. The composition comprises a bi-layer construction, including a first layer and a second layer, the first layer having a high elastic modulus and tensile strength in comparison to the second layer. The second layer includes a blowing agent such that, when cured, the first layer is spaced away from the substrate. The compositions of the first layer and second layer are similar, thus enabling the reconstitution of scrap into usable material for forming another multi-layer reinforcement.

19 Claims, 2 Drawing Sheets

(52) U.S. Cl.
CPC ...... *C09J 2301/12* (2020.08); *C09J 2301/302* (2020.08); *C09J 2301/408* (2020.08); *C09J 2301/41* (2020.08); *C09J 2301/50* (2020.08); *C09J 2400/14* (2013.01); *C09J 2400/26* (2013.01)

(58) Field of Classification Search
CPC ............. B32B 2405/00; C09J 2301/412; C09J 163/00; C09J 2463/00; C09J 2463/006; C09J 7/25; C09J 7/38; C09J 2203/354; C09J 2301/12; C09J 2301/302; C09J 2301/408; C09J 2301/41; C09J 2301/50; C09J 2400/14; C09J 2400/26
See application file for complete search history.

(56) References Cited

FOREIGN PATENT DOCUMENTS

| | | | | |
|---|---|---|---|---|
| WO | 2017/165643 | A1 | 9/2017 | |
| WO | WO-2018186262 | A1 * | 10/2018 | ............. B32B 27/34 |
| WO | 2018186262 | A1 | 11/2018 | |

OTHER PUBLICATIONS

India First Examination Report dated Nov. 16, 2023 (Application No. 202137051099).
Chinese Search Report and first office action dated Jul. 21, 2023 (Application No. 202080047854.9).
Brazil Office action dated Sep. 19, 2023 (Application No. BR 112021021822-0).

* cited by examiner

BILAYER REINFORCEMENT STRUCTURES

FIELD

The present teachings relate generally to a multi-layer reinforcing device comprising first and second layers having complementary formulations (e.g., ingredient sets).

BACKGROUND

For many years the transportation industry has been concerned with designing vehicle components that do not add significantly to the weight of a vehicle. At the same time, automotive applications require that these lightweight components be reinforced and/or sealed. In one example, the gauge of materials used in the transportation industry in recent years (including steel, aluminium, composite or plastic) has reduced dramatically. As one example, the gauge of materials used to make components such as side-doors has reduced from about 1.2 mm to about 0.7 mm.

A variety of multi-layer materials have been used to help stiffen and/or seal certain components of vehicles. Many of these multi-layer materials utilize a discrete layer of fabric or mesh. Examples of multi-layer devices that incorporate a discrete layer of fabric or mesh may be found in U.S. Application No. 2018/0057717, and International Publication No. 2017/165643, incorporated herein by reference for all purposes.

However, the discrete layer of fabric or mesh presents a variety of challenges including cost, tendency for read-through, and the inability to recycle and re-use the materials. Due to the dissimilar composition of layers in current reinforcements, manufacturing scrap cannot be easily reconstituted for further use. This same approach can be utilized whenever there is a desire to have differential properties in two layers, such as when there is a desire for differential tactile tackiness. Thus, there is a need to replace multi-layer structures which do not include complimentary materials that allow for recycling and/or re-use with a lightweight, lower cost, sufficiently reinforcing and/or sealing, re-usable material that substantially avoids the challenges of existing reinforcing materials.

SUMMARY

The present teachings provide for a bilayer composition comprising: a second layer that is pressure sensitive and a first layer in direct planar contact with the second layer, wherein the first layer contains a subset of the ingredients in the second layer to permit reconstitution of the materials of the first and second layers.

The first layer may have an elastic modulus that is higher than that of the second layer. The second layer and the first layer in combination may comprise about 20% to about 60% by weight epoxy resin. The first layer may contain a reinforcing filler that is present in an amount that is greater than an amount of reinforcing filler present in the second layer. The second layer may include a blowing agent and the first layer may be substantially free of any blowing agent.

One or more of the first and second layer may include epoxy resin selected from bisphenol-A epoxy resins, bisphenol-F epoxy resins, novolac epoxy resins, aliphatic epoxy resins, glycidylamine epoxy resins, or a combination thereof. One or more of the first layer and second layer may include a reinforcing filler selected from wollastonite, phlogopite, muscovite, vermiculite, talc or a combination thereof. One or more of the first layer and second layer may include a reinforcing filler having a particle size of from about 0.005 mm to about 3.40 mm. One or more of the first layer and second layer may include a reinforcing filler having an aspect ratio of about 3:1 to about 80:1 or even 100:1.

One or more of the first layer and the second layer may include a reinforcing fiber selected from nylon, polyamide, polyester, polypropylene, polyethylene, aramid, glass fibers, or a combination thereof. One or more of the first layer and second layer may include a reinforcing fiber having a length of from about 0.1 cm to about 2.0 cm. The first layer may include one or more of a curing agent, a curing agent accelerator, a toughening agent, and a flexibilizer. The second layer may include one or more of a curing agent, a curing agent accelerator, a blowing accelerator, a toughening agent, and a flexibilizer.

The second layer may have an elastic modulus of from about 0 GPa to about 5 GPa. The composition may be located in contact with a substrate material having a gauge of 1.0 mm or less.

The second layer, the first layer, or both the second layer and first layer may include a curing agent. One or more of the first layer and second layer may include a curing agent selected from modified and unmodified polyamines or polyamides, triethylenetetramine, diethylenetriamine, tetraethylenepentamine, cyanoguanidine, dicyandiamides, acid anhydrides, blocked isocyanates, imidazoles, or any combination thereof. The first layer may be dry to the touch in a green state prior to activation. The composition may be located into contact with a panel comprising aluminium, steel, plastic, or a composite material.

After activation the difference between the coefficient of thermal expansion of the second layer and that of a substrate that receives the reinforcement may be less than the difference between the coefficient of thermal expansion of the first layer and that of the substrate that receives the reinforcement. After activation, the second layer may continue to adhere to a substrate it contacts prior to activation and continues to adhere to the substrate when exposed to heat, cold, liquid, vehicle oil, and environmental salt.

The second layer and the first layer may have at least two components in common, at least three components in common, at least four components in common, or at least five components in common.

The elastic modulus of the first layer may be at least about 5 GPa. The first layer and second layer may be substantially co-extensive. The first layer may include at least 10% by weight, at least 20% by weight, at least 30% by weight, or at least 40% by weight reinforcing filler.

The teachings herein are further directed to a bilayer composition comprising a second layer that is pressure sensitive and includes a blowing agent. and a first layer in direct planar contact with the second layer such that the first layer has a higher elastic modulus than the second layer and is substantially free of any blowing agent. The first layer may contain a subset of the ingredients in the second layer to permit reconstitution of the materials of the first and second layers and the first layer and second layer may include one or more reinforcing filler and the first layer includes an amount of reinforcing filler that is greater than that of the second layer.

BRIEF DESCRIPTION OF THE DRAWINGS

The above and other aspects, features, and advantages of certain exemplary embodiments of the present invention will be more apparent from the following description taken in conjunction with the accompanying drawings in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION

The following description with reference to the accompanying drawings is provided to assist in a comprehensive understanding of exemplary embodiments of the invention. It includes various specific details to assist in that understanding but these are to be regarded as merely exemplary. Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents. As used herein, the terms "on top of", "overlaid", and their equivalents, when used in reference to the placement of the elements, refers to a direct surface contact between the lower element and upper element. The term "reinforcement" also describes structures that have sealing capability.

This application claims the benefit of the filing date of U.S. Provisional Application Ser. No. 62/839,948, filed on Apr. 29, 2019, the contents of that application being hereby incorporated by reference herein for all purposes.

The reinforcement described herein includes a second layer that provides one or more of green state (uncured) adhesion and cured adhesion. The second layer may serve to separate the first layer from a surface upon which the reinforcement is located. Such separation may make it possible to increase the cross-sectional moment of inertia which may lead to reduced deflection of the surface upon which the reinforcement is located. This benefit may be achieved through expansion (e.g. foaming) of the second layer, whereby the expansion moves the first layer further away from the neutral axis of the multilayer construction to achieve an increased cross-sectional moment of inertia. The second layer may also provide cured adhesion initially and throughout any environmental exposure. A further function of the second layer may be to reduce read-though (which may result from deformation of the assembly that occurs due to shrinkage upon cooling and coefficient of thermal expansion (CTE) mismatch). Thus, the second layer (either prior to or post-cure and/or foaming) may have a lower elastic modulus, may be one or more of soft to the touch, tacky to the touch, uncured, and pressure sensitive.

The first layer may function primarily to provide stiffness. Thus, the first layer may have a significantly higher modulus, especially as compared to the second layer. The first layer may also serve to improve handling (non-tacky). For handling purposes the first layer may be dry to the touch.

The compositions of both the first and second layer may preferably have one or more components in common within the ingredient set of each layer. The use of such complimentary formulations may allow for reprocessing and subsequent re-use of the material. More specifically, the first layer may have an ingredient set that includes components that are all (or nearly all) found in the second layer. Thus, when reprocessing, the mixing of the first layer into the second layer with addition of a complimentary ingredient set to form a new second layer will not deleteriously affect the behavior and attributes of the reprocessed second layer, because the second layer has been reconstituted fully.

The reinforcement described herein may comprise a two-layer heat activated material where a first layer is composed of a subset of the ingredients of a second layer. As a result, scrap material from the uncured heat activated reinforcement can be re-processed by adding ingredients not contained in the first layer to become the second layer. This enables the full reclamation of the scrap of the two-layer material. Further, each layer may have a fundamental but different function within the reinforcement.

It is possible that at least one of the first or second layer provides a reinforcing function. It is possible that at least one of the first or second layer provides a sealing function. It is possible that at least one of the first or second layer is dry to the touch. It is possible that at least one of the first or second layer is tacky. It is possible that the reinforcement is formed as a structural tape material. The reinforcement may include a handling film. The reinforcement may be substantially free of any handling layer. The use of certain sealing and/or structural materials may allow for pressure sensitive application without requiring a film for handling on the opposite side.

The reinforcement may comprise a bilayer structure. The bilayer structure of the reinforcement may include a first layer and a second layer. The first layer and second layer may comprise similar ingredients. As used herein, the term "similar", when used in conjunction with the constituents of the first layer and the second layer, refers to constituents that are, by identity, the same and/or compatible with each other and said constituents are described herein as utilized in both the first layer and the second layer. The similar composition of the first layer and the second layer may enable any manufacturing scrap to be reconstituted and re-used. The first layer, the second layer, or both that is obtained from manufacturing scrap, may be reconstituted into the first layer, the second layer, or both. Preferably, the manufacturing scrap may be reconstituted into the second layer after the addition of additives such as a blowing agent and lower molecular weight materials to render the uncured material pressure sensitive. Further, the entirety of the bilayer reinforcement may also be reconstituted into the second layer. In situations when first layer and second layer together are reconstituted into second layer material, the addition of ingredients is based on the amount of first layer material in the mixture. The term "manufacturing scrap" may refer to the trimmings of reinforcements that are trimmed and/or reinforcements that do not conform to specification such as by composition, shape, or dimension. The reinforcement may be manufactured and/or applied to a substrate by the process of extrusion. The reinforcement may be dispensed in the profile of any shape. The reinforcement may be located onto a carrier structure or may be carrier-free. The reinforcement may be applied to the substrate before the substrate is E-coated (an "electrocoating" or "electrophoretic painting process"). The reinforcement may be applied to the substrate before the substrate is subjected to elevated temperatures (e.g., oven bake). The reinforcement may be heat curable. For example, the reinforcement may be cured in the oven baking process that follows E-coating, and/or a subsequent paint bake step.

The first layer may function to provide reinforcement to the substrate. The first layer may be a layer disposed directly onto the second layer, on the surface of the second layer opposite the substrate. The first layer, when the reinforcement is cured, may be substantially parallel (e.g., within a margin of about 5 degrees) to the substrate. The reinforcement and the substrate may resemble an I-beam insofar as the high strength layers (e.g., the substrate and the first layer) have a thin cross-sectional thickness and are separated by a height. The first layer may embody high elastic modulus and high elastic strength and impart high elastic modulus and high strength to the reinforcement. The first layer may provide reinforcement while the second layer may assist in minimizing detrimental read-through issues. The first layer may comprise epoxy resin and additives such as reinforcing filler, reinforcing fiber, a blowing agent, a blowing agent accelerator, a curing agent, a curing accelerator, a flexibilizer, a toughening agent, or a combination thereof. The first layer may also be substantially free of any blowing agent and/or blowing accelerator. The first layer may exhibit low foaming characteristics such that the first layer's post-cure thickness is substantially similar (i.e., no more than a 20% or even no more than a 10% difference) to the first layer's pre-cure thickness. Preferably, the first layer may be free of foaming characteristics. Presence of a blowing agent and blowing accelerator in the first layer may solely be attributed to the first layer comprising a portion of reconstituted second layer. The elastic modulus and tensile strength properties of the first layer may be attributed to reinforcing filler, reinforcing fiber, crosslink density, or a combination thereof.

The second layer may function to space the first layer from the substrate. The second layer may be disposed directly onto the substrate. The second layer may have a lower elastic modulus as compared to the first layer following heat activation. The elastic modulus of the second layer may be from about 0.1 GPa to about 15 GPa, or about 1 GPa to about 10 GPa, from about 2 GPa to about 8 GPa, or from about 0 GPa to about 5 GPa. The elastic modulus of the first layer may be greater than that of that second layer, or from about 5 GPa to about 25 GPa (e.g., greater than 5 GPa). The second layer may comprise epoxy resin and additives such as reinforcing filler, reinforcing fiber, a blowing agent, a blowing accelerator, a curing agent, a curing accelerator, a flexibilizer, a toughening agent, or a combination thereof. The cured thickness of the second layer may contribute to an increased cross-sectional moment of inertia of the reinforcement and consequently a decreased deflection of the panel when loaded. The ratio of the uncured thickness of the first layer to the uncured thickness of the second layer may be from about 2:1 to 1:2.

In one specific embodiment, the substrate may be a thin gauge panel onto which the reinforcement is disposed. The panel may be any structural component used in vehicle construction in the automotive, recreational, and aerospace industries. The panel may be utilized in building construction, furniture, sporting equipment, appliances, or other areas where thin gauge materials are common. More particularly, the panel may be, but is not limited to, a door panel, hood, trunk, floor, frame, bumper, wheel well, fuselage, wing, stabilizer, the like, or a combination thereof. Even more particularly, the panel may be located on a portion of a vehicle exposed to direct impact, for instance a door panel or bumper. The panel may include materials typically used in vehicle construction such as steel, aluminium, polymer, composite, or any combination thereof. For example, the panel may be a steel sheet metal panel formed into a vehicle door. The panel may be thin gauge (about 1.0 mm or less), free of supporting structures (e.g., ribs), constructed from a lower density material than used traditionally (e.g., aluminium or alloys thereof in place of steel; magnesium or alloys thereof in place of aluminium), or a combination thereof. The panel may be subjected to elevated temperatures in the course of manufacturing. For example, the panel may be heated to 300° F. or more after an E-coat deposition process.

The epoxy resin present in one or more of the first and/or second layer, may function to assist bonding the second layer to the substrate, bond the first layer to the second layer, provide structural support, act as a carrier for additives, or any combination thereof. The epoxy resin may comprise any conventional dimeric, oligomeric, or polymeric epoxy material containing at least one epoxy functional group (e.g., reactive oxirane rings polymerizable by a ring opening reaction). The term "epoxy resin" may refer to one epoxy resin or a combination of epoxy resins. The epoxy resin may increase, modify and/or improve the reinforcement's adhesion, flow properties, or both. The epoxy resin may undergo reaction due to the presence of reactive oxirane rings in the epoxy resin. For example, upon heating the oxirane rings may react with a curing agent resulting in crosslinking and consequently hardening of the epoxy resin. The strength of the epoxy resin is often influenced by the degree of crosslinking. The epoxy resin may be di-functional, tri-functional, multi-functional, or a combination thereof. Preferably, the epoxy resin is predominantly di-functional. The epoxy resin may be aliphatic, cycloaliphatic, aromatic, or a combination thereof. A substantial portion (e.g., 50% or even 75% of the epoxy resin may be aromatic. More specifically, the epoxy resin may be selected from the group consisting of bisphenol-A epoxy resins (e.g., diglycidyl ethers of bisphenol-A), bisphenol-F epoxy resins (e.g., diglycidyl ethers of bisphenol-F), novolac epoxy resins (e.g., epoxy phenol novolacs (EPN) and epoxy cresol novolacs (ECN)), aliphatic epoxy resins (e.g., glycidyl epoxy resins and cycloaliphatic epoxides), glycidylamine epoxy resins (e.g., triglycidyl-p-aminophenol and N,N,N,N-tetraglycidyl-4,4-methylenebis benzylamine) or a combination thereof. The epoxy resin may be supplied as a solid (e.g., pellets, chunks, pieces), as a liquid, or a combination thereof. The term "solid" when used in combination with "epoxy resin" refers to an epoxy resin that is solid at a temperature of 23° C. The term "liquid" when used in combination with "epoxy resin" refers to an epoxy resin that is liquid at a temperature of 23° C. The first layer, the second layer, or both may comprise the epoxy resin in the amount of no less than about 2% by weight, more preferably no less than 15% by weight, and more preferably no less than 25% by weight epoxy resin. The first layer, the second layer, or both may comprise no more than about 70% by weight, more preferably no more than 55% by weight, and more preferably no more than 45% by weight.

While epoxy-based materials are described herein, it is also possible that other thermoset chemistries may be utilized, including but not limited to acrylic, phenolic and/or urethane-based materials.

Any additives present may function to modify the physical properties of the second layer and the first layer. The additives may include a curing agent, a curing agent accelerator, a blowing agent, a blowing accelerator, a reinforcing filler, a reinforcing fiber, a toughening agent, a flexibilizer or a combination thereof. The additives may be distributed or dispersed within the epoxy resin prior to the application on the panel.

The curing agent may function to cure the epoxy thereby achieving crosslinking (hardening) of the epoxy. The term "curing agent" may refer to one or a combination of curing agents. The first layer may include one or a combination of various curing agents that vary in identity or amount from the second layer, thereby resulting in the first layer achieving a degree of crosslinking that is higher as compared to the second layer, or vice versa. The curing agent may be activated by exposure to other substances or by exposure to a condition such as radiation, moisture, pressure, heat, or the like (e.g., latent cure). Preferably, the curing agent may be activated by heat. The curing agent may be multi-functional (e.g., di-functional, tri-functional). The curing agent may be aliphatic or aromatic. Preferably, the curing agent may be selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolac resins, copolymers such as those of phenol terpene, polyvinyl phenol, or bisphenol-A formaldehyde copolymers, bishydroxyphenyl alkanes or the like), dihydrazides, sulfonamides, diamino diphenyl sulfone, mercaptans, imidazoles, ureas, tertiary amines, boron trifluoride complexes, or a combination thereof. Preferably, the curing agent is selected from modified and unmodified polyamines or polyamides such as triethylenetetramine, diethylenetriamine, tetraethylenepentamine, cyanoguanidine, dicyandiamides and the like. Examples of suitable curing agents that are commercially available include Dyhard®, from AlzChem Group AG. Further examples of suitable curing agents are commercially available under the tradename Ancamine® (product numbers 2014, 2337, 2441 and 2442 for example) and dicyandiamide-based products sold under the tradename Amicure®, from Evonik, Inc. The first layer, the second layer, or both may contain the curing agent in the amount of about 0.001% to about 9.0% by weight, more preferably, about 0.1% to about 6.0% by weight, or even more preferably, about 2.0% by weight to about 6.0% by weight.

The curing accelerator may function to increase the cure rate and/or modify the cure temperature of the epoxy resin. The curing accelerator may include modified or unmodified urea. The term "curing accelerator" may refer to one or a combination of curing accelerators. Specifically, the curing accelerator may include methylene bis(phenyl dimethyl urea), imidazole, blocked amines, or a combination thereof. Examples of suitable curing accelerators include those sold under the tradename Omicure® (e.g., U52M), commercially available from Emerald Performance Materials. The first layer, the second layer, or both may include a curing accelerator in the amount of about 0.001% to about 9.0% by weight, more preferably, about 0.1% to about 6.0% by weight, or even more preferably, about 0.2% by weight to about 1.0% by weight.

The blowing agent may function to produce a cellular structure within the epoxy resin and/or reinforcement generally. The term "blowing agent" may refer to one or a combination of blowing agents. The blowing agent may produce a cellular structure by producing an inert gas upon activation and expanding the surrounding epoxy resin (e.g., chemical blowing agent). Alternatively, the blowing agent may produce a cellular structure by the expansion of polymeric shells (e.g., physical blowing agent). A physical blowing agent may involve boiling an organic solvent to expand a polymeric shell. The blowing agent may produce an open or closed cellular structure. The composition of the blowing agent may depend upon the type of open or closed cellular structure desired. For example, the composition of the blowing agent may have an effect on the cellular structure, the amount of expansion, and/or the rate of expansion. The blowing agent may include a chemical blowing agent, a physical blowing agent, or a combination thereof. The first layer, the second layer, or both may comprise the blowing agent in the amount of about 0.001% to about 10.0% by weight.

Chemical blowing agents may include compounds comprising one or more nitrogen containing groups such as amides, amines, and the like. Examples of suitable chemical blowing agents may include dinitrosopentamethylenetetramine, azodicarbonamide, 4,4'oxy-bis-(benzene-sulphonylhydrazide), toluene-4-sulfonylhydrazide, trihydrazinotriazine and N,N'-dimethyl-N,N'-dinitroso-terephthalamide. The blowing agents may be endothermic blowing agents such as bicarbonates or the like.

Physical blowing agents may include solvent filled polymeric shells that soften and expand upon exposure to heat. Examples of suitable physical blowing agents may include physical blowing agents sold under the tradename Expancel®, commercially available from Nouryon, Inc.

The blowing accelerator may function to increase the rate of expansion and/or decrease the activation temperature for foaming of the second layer, the first layer, or a combination thereof. The term "blowing accelerator" may refer to one or a combination of blowing accelerators. The blowing accelerator may increase the rate at which the blowing agents form inert gasses. The blowing accelerator may comprise a metal salt such as zinc oxide. Alternatively, the blowing accelerator may comprise an organic base such as urea. Alternatively, the blowing accelerator may comprise an organic acid such as adipic acid or benzoic acid. Alternatively, zinc benzene sulfinate may be used. The first layer, the second layer, or both may comprise the blowing accelerator in the amount of about 0.001% to about 2.0% by weight.

The reinforcing filler may function to impart stiffness to the reinforcement. The term "reinforcing filler" may refer to one or a combination of reinforcing fillers. The reinforcing filler may be dispersed homogenously within the epoxy resin. The reinforcing filler may be any silicate mineral. Particularly, the reinforcing filler is chosen from the inosilicate group, the phyllosilicate group, or a combination thereof. Reinforcing fillers chosen from the inosilicate group may be chosen from the pyroxene subgroup including wollastonite ($CaSiO_3$).

Reinforcing fillers chosen from the phyllosilicate group may be chosen from the mica subgroup including phlogopite ($KMg_3(AlSi_3)O_{10}(OH)_2$), or muscovite ($KAl_2(AlSi_3)O_{10}(OH)_2$). Reinforcing fillers chosen from the phyllosilicate group may be chosen from the clay mineral subgroup including vermiculite (($MgFe,Al)_3(Al,SO_4O_{10}(OH)_2.4H_2O$) or talc ($Mg_3Si_4O_{10}(OH)_2$). Preferably, the reinforcing filler comprises a material chosen from the phyllosilicate group. The reinforcing filler may be more effective when it is in a non 1:1 aspect ratio. The reinforcing filler may have an aspect ratio of about 3:1 to about 100:1. Preferably, the reinforcing filler may have an aspect ratio of about 20:1 to about 80:1. More preferably, the reinforcing filler may have an aspect ratio of about 30:1 to about 40:1. It may be appreciated that the term "aspect ratio" refers to the ratio of the largest dimension of a particle to the smallest dimension of a particle. The reinforcing filler may have a smallest dimension of about 1 micron to about 1000 microns (e.g., at the largest dimension). The reinforcing filler may have a particle size of about 20 microns to about 500 microns. The reinforcing filler may have a particle size of about 30 microns to about 100 microns. The reinforcing filler may be present in the second layer, the first layer, or a combination thereof in the range of about 20% to about 50% by weight. Preferably, the reinforcing filler may be present in the second layer, the first layer, or a combination thereof in the range of about 30% to about 40% by weight.

The reinforcing fiber may function to impart higher displacement to failure to the reinforcement. The term "reinforcing fiber" may refer to one or a combination of reinforcing fibers. The reinforcing fiber may be dispersed homogenously within the thermosetting resin, and/or within the reinforcement generally. The reinforcing fiber may be in the form of a pulp.

The reinforcing fiber may comprise polymeric fibers, glass fibers, carbon fibers or a combination thereof. Polymeric fibers may include nylon, polyamide, polyester, polypropylene, polyethylene, aramid fibers (e.g., Kevlar), the like, or a combination thereof. The reinforcing fiber may be chopped fiber. The reinforcing fiber may be a chopped length of about 0.1 cm or more, about 0.3 cm or more, or even more particularly about 0.6 cm or more. The reinforcing fiber may be about 2.5 cm or less, about 1.5 cm or less, or even more particularly about 1.0 cm or less. The reinforcing fiber may be present in the first layer, the second layer, or both in the amount of about 1% by weight to about 30% by weight, about 4% by weight to about 15% by weight, or even about 5% by weight to about 10% by weight A toughening agent may function to distribute energy within the reinforcement. The term "toughening agent" may refer to one or a combination of toughening agents. The toughening agent may include a mixture of various toughening agents. The toughening agent may contribute to an increased T-Peel strength, strain to failure, and/or fracture toughness. The toughening agent may comprise thermoplastics, thermosets or thermosettables, elastomers, combinations thereof or the like. Preferably, the toughening agent comprises an elastomer (including elastomer containing materials), a core/shell polymer-type particle (which may include but are not limited to elastomers), or a combination thereof. It may form part of a continuous polymeric matrix phase or it may be a discrete second or third phase particulate.

For the purpose of specification, the term "core/shell impact modifier" refers to an impact modifier wherein a substantial portion (e.g., greater than 30%, 50%, or 70% by weight or more) thereof is comprised of a first polymeric material (the first material or the core material) that is substantially entirely encapsulated by a second polymeric material (the second material or the shell material). The first and second polymeric materials, as used herein, can be comprised of one, two, three or more polymers that are combined and/or reacted together (e.g., sequentially polymerized) or may be part of separate or the same core/shell systems.

The flexibilizer may function to provide, to the reinforcement, the property of strain or displacement without breaking. The term "flexibilizer" may refer to one or a combination of flexibilizers. The flexibilizer may comprise polymers with or without reactivity. The term "flexibilizer" refers to a single flexibilizer or to a combination of different flexibilizers. Flexibilizers may be present in the first layer, the second layer, or both in the amount of at least about 2% by weight, more preferably at least about 3% by weight, and even more preferably at least about 5% by weight. Flexibilizers may be present in the first layer, the second layer, or both in the amount of no more than about 50% by weight, more preferably no more than about 35% by weight, and even more preferably no more than about 20% by weight. Suitable flexibilizers may include polyvinyl esters, polyvinyl butyral resins, amine-modified polymers (including amine-terminated polyethers), epoxy-modified polymers (including epoxidized polysulfides, epoxy-dimer acid elastomers, polyurethane-modified epoxy, epoxy-terminated polyethers), cashew nutshell liquid derivatives (including epoxidized liquids commercially available under the tradename Cardolite®, such as NC-514 and Lite 2513HP), or a combination thereof. Amine-modified polymers, epoxy modified polymers, or both may include polymers that are thermoplastics, thermosets, elastomers, or a combination thereof. The polymers may be modified with aromatic epoxy, non-aromatic epoxy, bisphenol-F type epoxy, bisphenol-A type epoxy, or a combination thereof.

The reinforcement may be shaped after being formed in a sheet utilizing a rotary or flat-bed die cutting process. The reinforcement may be formed in a press. The reinforcement may be extruded and cut to a desired length and/or shape.

A 3-point bend test may be utilized to characterize the reinforcement properties of the layers. Results are obtained according to ASTM D790. The bilayer reinforcements are laminated to approximately 0.8 mm thick cold rolled steel substrates one inch wide by six inches in length. A bake condition of 325° F. for 30 minutes is used unless otherwise specified. Specimens are tested using a 100 mm span and loading the metal side of the specimens in the middle of this span at a displacement rate of 5 mm/min and graphing the load vs. displacement curve. The vertical rise is determined by dividing the total cured thickness of the bilayer by the initial uncured thickness and multiplying by 100.

Non-limiting example formulations are set forth in Tables 1, 3, 5, 7, and 9 below. 3-point bend test results utilizing the example formulations set forth at Tables 1, 3, 5, 7, and 9 are set forth in numerical form at Tables 2, 4, 6, 8, and 10 below. Table 2 is set forth in graph form at FIG. 2.

TABLE 1

|  | First layer (%) | Second layer (%) |
|---|---|---|
| Solid Epoxy Rubber Adduct A | 14.00 | 14.00 |
| Impact Modifier in Epoxy Resin | 14.00 | 14.00 |
| Bisphenol A Epoxy, EEW = 190 | 20.40 | 34.19 |
| Phlogopite Mica | 40.00 | 26.92 |
| ⅛" Chopped Glass Fiber | 4.00 | 2.69 |
| Aramid Pulp | 4.00 | 2.69 |

TABLE 1-continued

|  | First layer (%) | Second layer (%) |
|---|---|---|
| Dicyandiamide | 3.20 | 3.20 |
| Modified Urea | 0.40 | 0.40 |
| Azodicarbonamide |  | 1.82 |
| Pigment |  | 0.10 |
|  | 100.00 | 100.00 |

TABLE 2

|  | First Layer Alone | Second Layer Alone | ½ first layer ½ second layer |
|---|---|---|---|
| Total Initial Thickness, mm | 1.18 | 1.13 | 1.24 |
| Total Cured Thickness, mm | 1.46 | 2.73 | 2.45 |
| Vertical Rise | 124% | 242% | 196% |
| Load at 1 mm displacement, N | 7 | 17 | 51 |
| Load at 2 mm displacement, N | 32 | 40 | 93 |
| Load at 2.5 mm displacement, N | 44 | 51 | 111 |
| Load at 5 mm displacement, N | 95 | 86 | NA |
| Peak Load | 107 | 92 | 137 |

TABLE 3

|  | First layer (%) | Additions made to first layer to generate second layer (%) | Second layer (%) |
|---|---|---|---|
| Solid Epoxy Rubber Adduct B | 6.00 |  | 5.31 |
| Polyurethane impact modifier | 4.00 |  | 3.54 |
| Impact Modifier in Epoxy Resin | 14.00 |  | 12.39 |
| Epoxidized Natural Rubber | 5.00 |  | 4.43 |
| Bisphenol A Epoxy, EEW = 190 | 20.40 | 5.0 | 23.05 |
| Epoxidized Dimer Fatty Acid |  | 5.0 | 5.00 |
| Muscovite Mica | 37.50 |  | 33.19 |
| ⅛" Chopped Glass Fiber | 8.00 |  | 7.08 |
| Aramid Pulp | 2.30 |  | 2.04 |
| Dicyandiamide | 2.40 | 1.0 | 3.12 |
| Modified Urea | 0.40 |  | 0.35 |
| Azodicarbonamide |  | 0.4 | 0.40 |
| Pigment |  | 0.1 | 0.10 |
| First Layer |  | 88.5 |  |
|  | 100.00 | 100.00 | 100.00 |

TABLE 4

| Ratio of First:Second Layer | 1:0 | 2:1 | 1:1 | 1:2 | 0:1 |
|---|---|---|---|---|---|
| Total Initial Thickness, mm | 1.20 | 1.25 | 1.20 | 1.21 | 1.23 |
| Total Cured Thickness, mm | 1.40 | 1.83 | 1.74 | 1.84 | 2.03 |
| Vertical Rise | 117% | 147% | 145% | 152% | 165% |
| Load at 1 mm displacement, N | 30 | 38 | 33 | 36 | 33 |
| Load at 2 mm displacement, N | 50 | 65 | 57 | 61 | 56 |
| Load at 2.5 mm displacement, N | 60 | 78 | 69 | 73 | 67 |
| Load at 5 mm displacement, N | 100 | 125 | 110 | 119 | 109 |
| Peak Load, N | 131 | 146 | 119 | 139 | 126 |
| Extension at Break, mm | 8.83 | 7.03 | 5.98 | 7.02 | 6.60 |

TABLE 5

|  | First Layer (%) | Additions Made to First Layer to Generate Second Layer (%) | Second Layer (%) |
|---|---|---|---|
| Solid Epoxy Rubber Adduct B | 6.00 |  | 5.29 |
| Polyurethane impact modifier | 4.00 |  | 3.52 |
| Impact Modifier in Epoxy Resin | 14.00 |  | 12.33 |
| Epoxidized Natural Rubber | 5.00 |  | 4.41 |
| Bisphenol A Epoxy, EEW = 190 | 20.40 | 5.00 | 22.97 |
| Epoxidized Dimer Fatty Acid |  | 5.00 | 5.00 |
| Muscovite Mica | 37.50 |  | 33.04 |
| ⅛" Chopped Glass Fiber | 8.00 |  | 7.05 |
| Aramid Pulp | 2.30 |  | 2.03 |
| Dicyandiamide | 2.40 | 1.00 | 3.11 |
| Modified Urea | 0.40 |  | 0.35 |
| Azodicarbonamide |  | 0.80 | 0.80 |
| Pigment |  | 0.10 | 0.10 |
| First Layer |  | 88.10 |  |
|  | 100.00 | 100.00 | 100.00 |

TABLE 6

| Ratio of First:Second Layer | 1:0 | 2:1 | 1:1 | 1:2 | 0:1 |
|---|---|---|---|---|---|
| Total Initial Thickness, mm | 1.23 | 1.24 | 1.25 | 1.25 | 1.21 |
| Total Cured Thickness, mm | 1.51 | 1.74 | 1.86 | 1.99 | 2.08 |
| Vertical Rise | 123% | 141% | 150% | 159% | 172% |
| Load at 1 mm displacement, N | 31 | 36 | 43 | 40 | 34 |
| Load at 2 mm displacement, N | 52 | 62 | 74 | 68 | 58 |
| Load at 2.5 mm displacement, N | 62 | 73 | 87 | 81 | 69 |
| Load at 5 mm displacement, N | 101 | 110 | 111 | 129 | 111 |
| Peak Load, N | 123 | 113 | 141 | 143 | 125 |
| Extension at Break, mm | 7.45 | 5.88 | 5.39 | 6.19 | 6.37 |

TABLE 7

| | First Layer (%) | Additions Made to First Layer to Generate Second Layer (%) | Second Layer (%) |
|---|---|---|---|
| Solid Epoxy Rubber Adduct B | 6.00 | | 5.23 |
| Polyurethane impact modifier | 4.00 | | 3.48 |
| Impact Modifier in Epoxy Resin | 14.00 | | 12.19 |
| Epoxidized Natural Rubber | 5.00 | | 4.36 |
| Wollastonite | 37.50 | | 32.66 |
| Bisphenol A Epoxy, EEW = 190 | 19.90 | 5.00 | 22.33 |
| Epoxidized Dimer Fatty Acid | | 5.00 | 5.00 |
| ⅛" Chopped Glass Fiber | 8.00 | | 6.97 |
| Aramid Pulp | 2.30 | | 2.00 |
| Organic Peroxide | 0.50 | | 0.44 |
| Dicyandiamide | 2.40 | 1.00 | 3.09 |
| Modified Urea | 0.40 | | 0.35 |
| Azodicarbonamide | | 1.80 | 1.80 |
| Pigment | | 0.10 | 0.10 |
| First Layer | | 87.10 | |
| Totals | 100.00 | 100.00 | 100.00 |

TABLE 8

| Ratio of First:Second Layer | 1:0 | 2:1 | 1:1 | 1:2 | 0:1 |
|---|---|---|---|---|---|
| Total Initial Thickness, mm | 1.20 | 1.25 | 1.24 | 1.23 | 1.18 |
| Total Cured Thickness, mm | 1.64 | 1.89 | 2.18 | 2.10 | 2.30 |
| Vertical Rise | 137% | 151% | 176% | 171% | 195% |
| Load at 1 mm displacement, N | 27 | 36 | 50 | 39 | 33 |
| Load at 2 mm displacement, N | 45 | 62 | 87 | 66 | 57 |
| Load at 2.5 mm displacement, N | 54 | 73 | 103 | 79 | 68 |
| Load at 5 mm displacement, N | 91 | 120 | 162 | 130 | 102 |
| Peak Load | 126 | 145 | 172 | 155 | 112 |
| Extension at Break, mm | 9.3 | 7.3 | 5.7 | 7.1 | 5.3 |

TABLE 9

| | First Layer (%) | Additions Made to First Layer to Generate Second Layer (%) | Second Layer (%) |
|---|---|---|---|
| Solid Epoxy Rubber Adduct B | 6.00 | | 3.00 |
| Polyurethane impact modifier | 4.00 | | 2.00 |
| Impact Modifier in Epoxy Resin | 14.00 | | 7.00 |
| Epoxidized Natural Rubber | 5.00 | | 2.50 |
| Phenoxy Resin 28% Dissolved in Epoxidized Bis-Phenol F | | 40.90 | 40.90 |
| Bisphenol A Epoxy, EEW = 190 | 19.90 | | 9.95 |
| Epoxidized Dimer Fatty Acid | | 5.00 | 5.00 |
| Muscovite Mica | 37.50 | | 18.75 |
| ⅛" Chopped Glass Fiber | 8.00 | | 4.00 |
| Aramid Pulp | 2.30 | | 1.15 |
| Organic Peroxide | 0.50 | | 0.25 |
| Dicyandiamide | 2.40 | 2.00 | 3.20 |
| Modified Urea | 0.40 | 0.20 | 0.40 |
| Azodicarbonamide | | 1.80 | 1.80 |
| Pigment | | 0.10 | 0.10 |
| Batch 27 | | 50.00 | |
| Totals | 100.00 | 100.00 | 100.00 |

TABLE 10

| | First Layer Alone | Second Layer Alone | ½ first layer ½ second layer |
|---|---|---|---|
| Total Initial Thickness, mm | 1.17 | 1.16 | 1.23 |
| Total Cured Thickness, mm | 1.78 | 3.36 | 3.03 |
| Vertical Rise | 152% | 290% | 246% |
| Load at 1 mm, N | 35 | 39 | 57 |
| Load at 2 mm, N | 59 | 69 | 100 |
| Load at 2.5 mm, N | 70 | 83 | 117 |
| Load at 5 mm, N | 115 | 69 | 74.8 |
| Peak Load, N | 129 | 125 | 149 |
| Extension at Break, mm | 6.4 | 4.3 | 3.7 |

Some applications may require optimization of the bilayer reinforcement for maximum peak load or extension to break. However, in many or most applications an increase in stiffness of the system is desired and this is achieved by optimizing/maximizing the load at low displacements such as 1 mm, 2 mm or 2.5 mm. It is also possible that the load at low displacement in some of the bilayer examples is over 50% higher for the bilayer compared to the expanding layer alone and nearly double that of the non-expanding layer alone. The combination of the first and second layer at the same initial thickness as the first or second layers alone produces a significantly higher load as a function of displacement as compared to the first or second layer alone.

Figure 1:
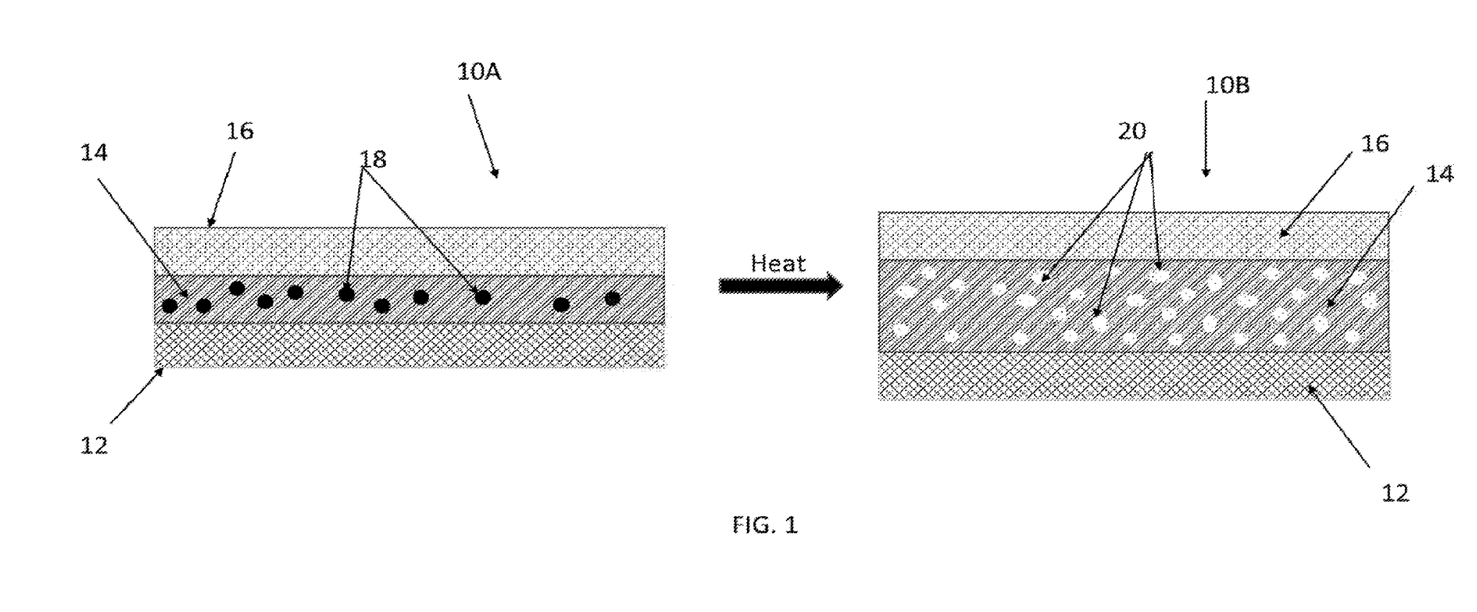
FIG. 1 illustrates a green-state and post-cure reinforcement including a panel.

FIG. 1 illustrates a reinforcement 10A and 10B including a panel (e.g., substrate) 12. The reinforcement is shown prior to foaming 10A and then after foaming 10B. The reinforcement 10A and 10B includes a first layer 16 and a second layer 14, where the second layer 14 is tacky prior to foaming in 10A. The second layer 14 differs from the first layer in that it includes a foaming agent (e.g., a blowing agent) 18. Upon foaming (10B), the foaming agent is reacted and therefore no longer present, while cellular structures 20 are formed in the second layer 14. The second layer 14 is a tacky layer and is disposed directly on the panel 12 and the first layer 16 is disposed in direct planar contact with the second layer 14.

Figure 2:
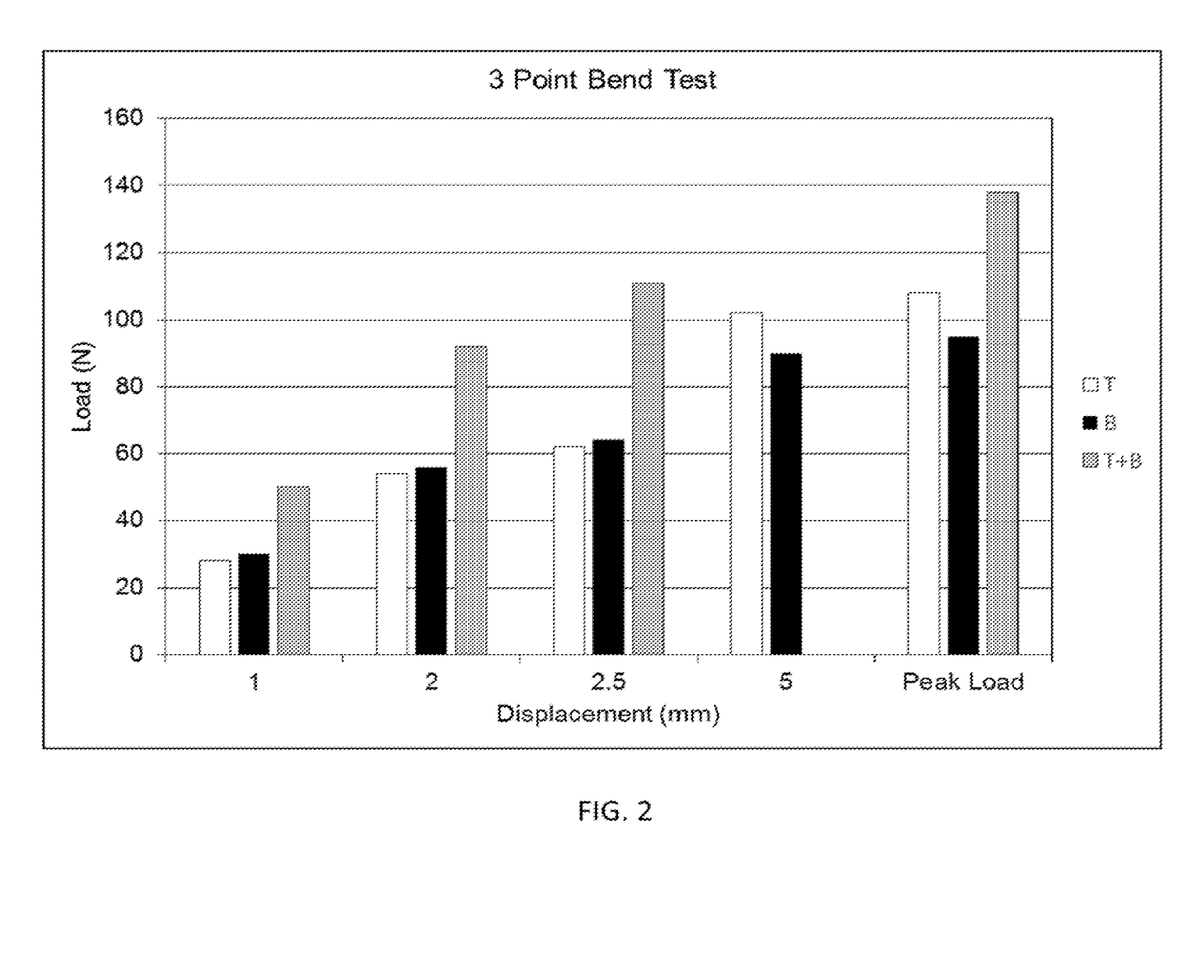
FIG. 2 illustrates a bar graph of the results of a 3-point bend test (ASTM D790).

FIG. 2 illustrates a bar graph of the results of a 3-point bend test (see Table 2 above for numerical results). Sample, "T", comprises only the first layer and was dispensed at a thickness of about 1.2 mm (pre-cured). Sample, "B", comprises only the second layer and was dispensed at a thickness of about 1.2 mm (pre-cured). Sample, "T+B", comprises both the first layer and second layer; the first layer was dispensed at a thickness of about 0.6 mm (pre-cured) and the second layer was dispensed at a thickness of about 0.6 mm (pre-cured).

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, from 20 to 80, or even from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates examples that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A bilayer composition comprising:
a. a second layer that is pressure sensitive; and
b. a first layer in direct planar contact with the second layer;
wherein the first layer contains a subset of the ingredients in the second layer to permit reconstitution of the materials of the first and second layers; and
wherein the first layer has an elastic modulus that is higher than that of the second layer;
wherein the second layer includes a blowing agent and the first layer is substantially free of any blowing agent.

2. The composition of claim 1, wherein the second layer and the first layer in combination comprise about 20% to about 60% by weight epoxy resin.

3. The composition of claim 2, wherein one or more of the first and second layer include epoxy resin selected from bisphenol-A epoxy resins, bisphenol-F epoxy resins, novolac epoxy resins, aliphatic epoxy resins, glycidylamine epoxy resins, or a combination thereof.

4. The composition of claim 3, wherein the first layer includes one or more of a curing agent, a curing agent accelerator, a toughening agent, and a flexibilizer.

5. The composition of claim 3, wherein the second layer includes one or more of a curing agent, a curing agent accelerator, a blowing accelerator, a toughening agent, and a flexibilizer.

6. The composition of claim 3, wherein the composition is adapted to be activated to foam and/or cure and wherein the first layer is dry to the touch in a green state prior to activation.

7. The composition of claim 6, wherein after activation the difference between the coefficient of thermal expansion of the second layer and that of a substrate that receives the composition is less than the difference between the coefficient of thermal expansion of the first layer and that of the substrate that receives the composition.

8. The composition of claim 1, wherein the first layer contains a reinforcing filler that is present in an amount that is greater than an amount of reinforcing filler present in the second layer.

9. The composition of claim 2, wherein the second layer, the first layer, or both the second layer and first layer include a curing agent.

10. The composition of claim 2, wherein the elastic modulus of the first layer is at least about 5 GPa.

11. The composition of claim 1, wherein one or more of the first layer and second layer include a reinforcing filler having a particle size of from about 0.04 mm to about 3.40 mm.

12. The composition of claim 1, wherein one or more of the first layer and second layer includes a reinforcing fiber having a length of from about 0.1 cm to about 2.0 cm.

13. The composition of claim 1, wherein the second layer has an elastic modulus of from about 0 GPa to about 5 GPa.

14. The composition of claim 1, wherein the composition is located in contact with a substrate material having a gauge of 1.0 mm or less.

15. The composition of claim 1, wherein the composition is located in contact with a panel comprising aluminium, steel, plastic, or a composite material.

16. The composition of claim 1, wherein the second layer and the first layer have at least two components in common, at least three components in common, at least four components in common, or at least five components in common.

17. The composition of claim 1, wherein the first layer and second layer are substantially co-extensive.

18. A bilayer composition comprising:
a. a second layer that is pressure sensitive and includes a blowing agent; and
b. a first layer in direct planar contact with the second layer such that the first layer has a higher elastic modulus than the second layer and is substantially free of any blowing agent;
  wherein the first layer contains a subset of the ingredients in the second layer to permit reconstitution of the materials of the first and second layers; and
  wherein the first layer and second layer include one or more reinforcing filler and the first layer includes an amount of reinforcing filler that is greater than that of the second layer.

19. A bilayer composition comprising:
a. a second layer that is pressure sensitive; and
b. a first layer in direct planar contact with the second layer;
  wherein the first layer contains a subset of the ingredients in the second layer to permit reconstitution of the materials of the first and second layers; and
  wherein the first layer has an elastic modulus that is higher than that of the second layer;
  wherein one or more of the first layer and second layer include a reinforcing filler having an aspect ratio of about 3:1 to about 100:1.

* * * * *